United States Patent
Achleitner et al.

(10) Patent No.: US 7,328,689 B2
(45) Date of Patent: Feb. 12, 2008

(54) METHOD FOR MONITORING A FUEL SUPPLY PERTAINING TO AN INTERNAL COMBUSTION ENGINE

(75) Inventors: Erwin Achleitner, Obertraubling (DE); Martin Cwielong, Regensburg (DE); Gerhard Eser, Hemau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/547,813

(22) PCT Filed: Feb. 16, 2005

(86) PCT No.: PCT/EP2005/050672

§ 371 (c)(1),
(2), (4) Date: Oct. 5, 2006

(87) PCT Pub. No.: WO2005/098561

PCT Pub. Date: Oct. 20, 2005

(65) Prior Publication Data

US 2007/0213918 A1    Sep. 13, 2007

(30) Foreign Application Priority Data

Apr. 5, 2004  (DE) .................... 10 2004 016 724

(51) Int. Cl.
*F02M 1/00* (2006.01)
*F02M 55/02* (2006.01)

(52) U.S. Cl. .................... 123/446; 123/456; 123/480

(58) Field of Classification Search ................ 123/446, 123/447, 478, 479, 456, 458; 73/115
See application file for complete search history.

(56) References Cited

U.S. PATENT DOCUMENTS

| 4,449,507 | A | * | 5/1984 | Mayer ........................ 123/467 |
| 5,678,521 | A | * | 10/1997 | Thompson et al. ......... 123/447 |
| 6,053,147 | A | * | 4/2000 | Hemmerlein et al. ....... 123/447 |
| 6,055,961 | A | | 5/2000 | Friedrich et al. |
| 6,234,148 | B1 | | 5/2001 | Hartke et al. |
| 6,293,251 | B1 | * | 9/2001 | Hemmerlein et al. ....... 123/447 |
| 2004/0055576 | A1 | * | 3/2004 | McCarthy, Jr. .............. 123/458 |

FOREIGN PATENT DOCUMENTS

| DE | 197 57 594 A1 | 7/1999 |
| DE | 101 36 706 A1 | 2/2002 |
| DE | 100 57 786 A1 | 6/2002 |
| DE | 101 62 989 C1 | 10/2003 |

* cited by examiner

*Primary Examiner*—John T. Kwon

(57) ABSTRACT

The invention relates to a fuel supply device pertaining to an internal combustion engine. Said fuel supply device has a regulating device comprising a first regulator, which is provided with at least one integral part and which produces, in a first mode of operation, a regulating signal for a volume flow control valve, and a second regulator that produces a regulating signal for an electromechanical pressure regulator in a second mode of operation. In the first mode of operation, an error in the fuel supply device is identified according to the integral part of the first regulator. In the second mode of operation, an error in the fuel supply device is identified according to a detected fuel pressure and the regulating signal for the electromechanical pressure regulator.

8 Claims, 4 Drawing Sheets

METHOD FOR MONITORING A FUEL SUPPLY PERTAINING TO AN INTERNAL COMBUSTION ENGINE

CROSS REFERENCE TO RELATED APPLICATIONS

This application is the US National Stage of International Application No. PCT/EP2005/050672, filed Feb. 16, 2005 and claims the benefit thereof. The International Application claims the benefits of German Patent application No. 10 2004 016 724.9 filed Apr. 5, 2004. All of the applications are incorporated by reference herein in their entirety.

FIELD OF THE INVENTION

The invention relates to a method of monitoring a fuel supply of an internal combustion engine.

BACKGROUND OF THE INVENTION

The demands made on internal combustion engines, in particular in motor vehicles, are increasing owing to legal regulations relating to pollutant emissions and owing to customers' requests with respect to reliability, efficient use of operating fluid, in particular fuel, and low maintenance costs. These demands can only be satisfied if malfunctions of vehicle components are reliably and accurately identified and recorded, so malfunctions may be compensated for or the vehicle components that are faulty may be repaired. For this purpose vehicle components, in particular all vehicle components relevant to exhaust gas, such as the catalyst system, lambda probe and the complete fuel system, are monitored. Low-pollutant operation is to be ensured by the monitoring measures and the driving safety maintained. This includes being able to ensure operation of the internal combustion engine under emergency conditions in the event of errors occurring and avoiding consequential damage. The driver of the motor vehicle is informed about the malfunction, so he can prompt an inspection and possibly repair in a workshop. The monitoring facility of the internal combustion engine stores information about the errors that have occurred, such as the type of error, the location of the error and the operating conditions under which the malfunction occurred. This information can be evaluated in a workshop and thus assists repair work.

SUMMARY OF THE INVENTION

The object of the invention is to specify a method which reliably monitors fuel supply devices of internal combustion engines.

The object is achieved by the features of the independent claims. Advantageous developments of the invention are identified in the sub-claims.

The invention is characterized by a method for monitoring a fuel supply device pertaining to an internal combustion engine, wherein the fuel supply device comprises a low pressure circuit, a high pressure pump that is coupled to the low pressure circuit at the input side and conveys the fuel into a fuel accumulator, a volume flow control valve associated with the high pressure pump, and an electromechanical pressure regulator that is actively connected to the fuel accumulator and the low pressure circuit and can stop the flow of fuel from the fuel accumulator into the low pressure circuit. In a first operating mode of the method a regulating signal for the volume flow control valve is generated by means of a first regulator, wherein the first regulator comprises at least one integral part and a difference in a specified fuel pressure and a detected fuel pressure is supplied to the first regulator as a control deviation. In a second operating mode a regulating signal for the electromechanical pressure regulator is generated by means of a second regulator, wherein the difference in the specified fuel pressure and the detected fuel pressure is supplied to the second regulator as the control deviation. In the first operating mode an error in the fuel supply device is identified as a function of the integral part of the first regulator. In the second operating mode an error in the fuel supply device is identified as a function of the detected fuel pressure and the regulating signal for the electromechanical pressure regulator.

The advantage is that fuel supply devices which have both a volume flow control valve and an electromechanical pressure regulator can be reliably monitored. Errors in components of the fuel supply device may be easily identified. The method uses the devices required anyway for regulation of the fuel pressure in the fuel accumulator and does not require any additional fuel supply device components.

In the first operating mode an error in the fuel supply device is advantageously identified if the integral part of the first regulator is less than a specified lower tolerance limit of the integral part or is greater than a specified upper tolerance limit of the integral part. This method has the advantage that errors may be identified in the fuel supply device even during transient operation of the internal combustion engine if the fuel pressure is not constant in the fuel accumulator.

A further preferred embodiment of the method is characterized in that in the second operating mode an error in the fuel supply device is identified if the detected fuel pressure is less than a lower tolerance limit for the fuel pressure specified by the regulating signal for the electromechanical pressure regulator or is greater than an upper tolerance limit for the fuel pressure specified by the regulating signal for the electromechanical pressure regulator. This has the advantage that faulty fuel supply device components may be identified very easily.

According to a development of the invention the fuel supply device is fitted with a combination valve which comprises the volume flow control valve and the electromechanical pressure regulator and which has a common actuator for the volume flow control valve and the electromechanical pressure regulator. By means of the combination valve the method adjusts the first operating mode such that the current value of a common regulating signal is in a first value range of the common regulating signal, or adjusts the second operating mode such that the current value of the common regulating signal is in a second value range of the common regulating signal. One advantage of this method is that the combination can be very reliable and simple to control. Costs are reduced as a result.

BRIEF DESCRIPTION OF THE DRAWINGS

Exemplary embodiments of the invention are described hereinafter with reference to schematic drawings, in which.

Elements with the same construction and function are provided with the same reference numerals in all figures.

DETAILED DESCRIPTION OF THE INVENTION

Figure 1:
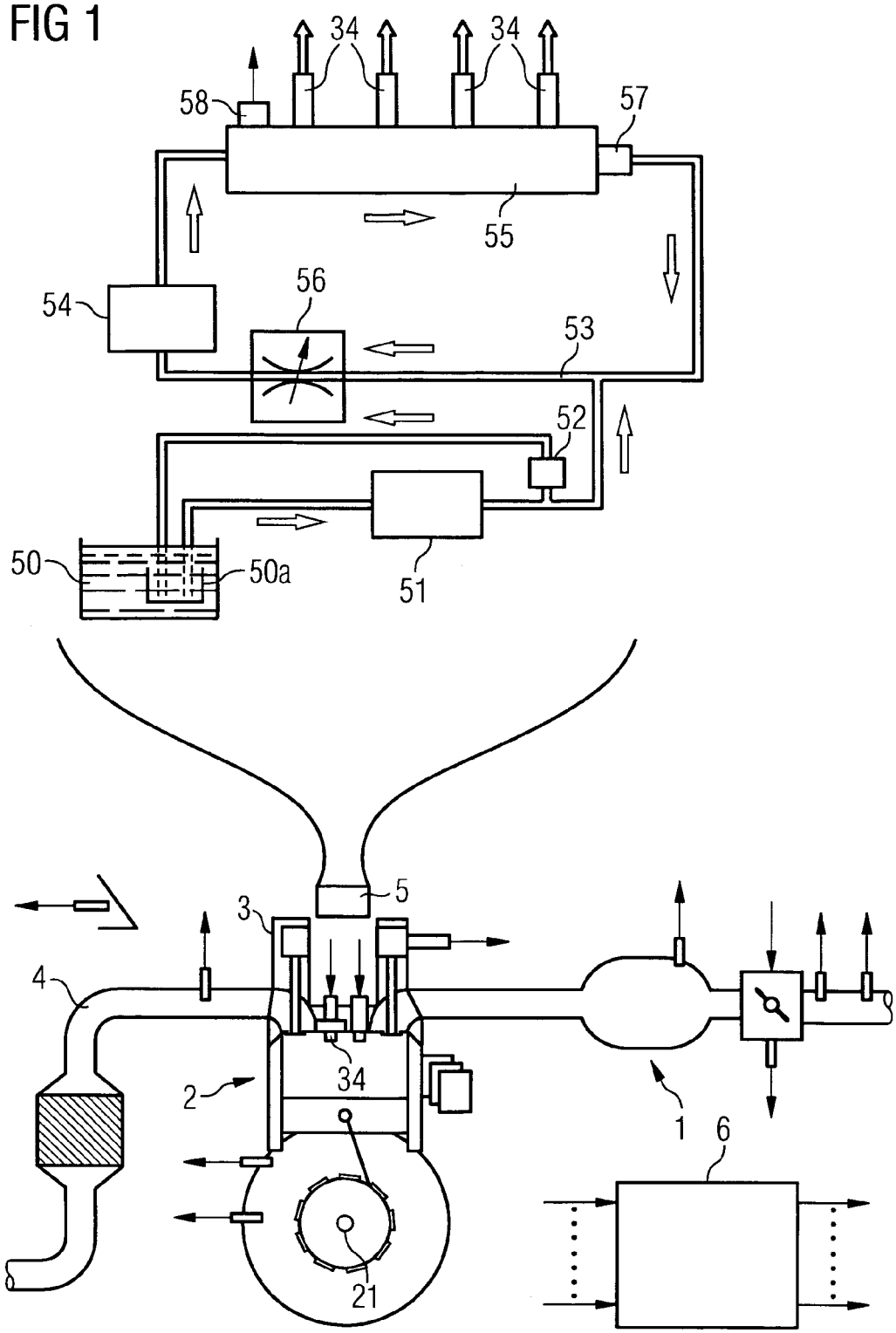
FIG. 1 shows an internal combustion engine comprising a fuel supply device.

An internal combustion engine (FIG. 1) comprises an intake duct 1, a motor unit 2, a cylinder head 3 and an exhaust gas duct 4. The motor block 2 comprises a plurality of cylinders which have pistons and connecting rods via which they are coupled to a crankshaft 21.

The cylinder head 3 comprises a valve train assembly comprising a gas inlet valve, a gas outlet valve and valve operating mechanisms. The cylinder head 3 also comprises an injection valve 34 and a spark plug.

A supply device 5 for fuel is also provided. This comprises a fuel tank 50 which is connected via a first fuel line to a low pressure pump 51. The fuel line ends in a swirl pot 50a. At the output side the low pressure pump 51 is actively connected to an admission 53 of a high pressure pump 54. A mechanical regulator 52, which is connected at the output-side to the fuel tank 50 via an additional fuel line, is also provided at the output-side of the low pressure pump 51. The low pressure pump 51, the mechanical regulator 52, the fuel line, the additional fuel line and the admission 53 form a low pressure circuit.

The low pressure pump 51 is preferably configured in such a way that during operation of the internal combustion engine it always supplies an adequate volume of fuel to ensure that a specified low pressure is not fallen below.

The admission 53 is guided to the high pressure pump 54 which at the output side conveys the fuel toward a fuel accumulator 55. The high pressure pump 54 is usually driven by the camshaft and thus conveys a constant volume of fuel into the fuel accumulator 55 with a constant speed of the crankshaft 21.

The injection valves 34 are actively connected to the fuel accumulator 55. The fuel is thus supplied to the injection valves 34 via the fuel accumulator 55.

In the approach of the high pressure pump 54, i.e. upstream of the high pressure pump 54, a volume flow control valve 56 is provided by means of which the volume flow that is supplied to the high pressure pump 54 may be adjusted. A specified fuel pressure FUP_SP in the fuel accumulator 55 can be adjusted by corresponding activation of the volume flow control valve 56.

The fuel supply device 5 is also provided with an electromagnetic pressure regulator 57 at the output side of the fuel accumulator 55 and with a return line into the low pressure circuit. If a fuel pressure in the fuel accumulator 55 is greater than the fuel pressure FUP_SP specified by corresponding activation of the electromechanical pressure regulator 57, the electromechanical pressure regulator 57 opens and fuel is discharged from the fuel accumulator 55 into the low pressure circuit.

Alternatively the volume flow control valve 56 may also be integrated in the high pressure pump 54 or the electromechanical pressure regulator 57 and the volume flow control valve 56 are adjusted via a common actuator, as is illustrated by way of example in FIG. 2 and described in more detail below.

The internal combustion engine is associated with a control device 6 which is in turn associated with sensors which detect various measured quantities and determine the measured value of the measured quantities in each case. As a function of at least one of the measured quantities the control device 6 determines regulating variables which are then converted into corresponding regulating signals to control actuators by means of corresponding final controlling elements.

The sensors are for example a pedal position sensor which detects the position of an accelerator pedal, a crankshaft angle sensor which detects a crankshaft angle and with which a motor speed is then associated, an airflow measuring device and a fuel pressure sensor 58 which detects a fuel pressure FUP_AV in the fuel accumulator 55. Any desired subset of sensors or additional sensors may be present depending on the embodiment of the invention.

The actuators are constructed for example as gas inlet or gas outlet valves, injection valves 34, a spark plug, throttle valve, low pressure pump 51, volume flow control valve 56 or as an electromechanical pressure regulator 57.

The internal combustion engine preferably also has additional cylinders with which appropriate final controlling elements are then associated.

Figure 2:
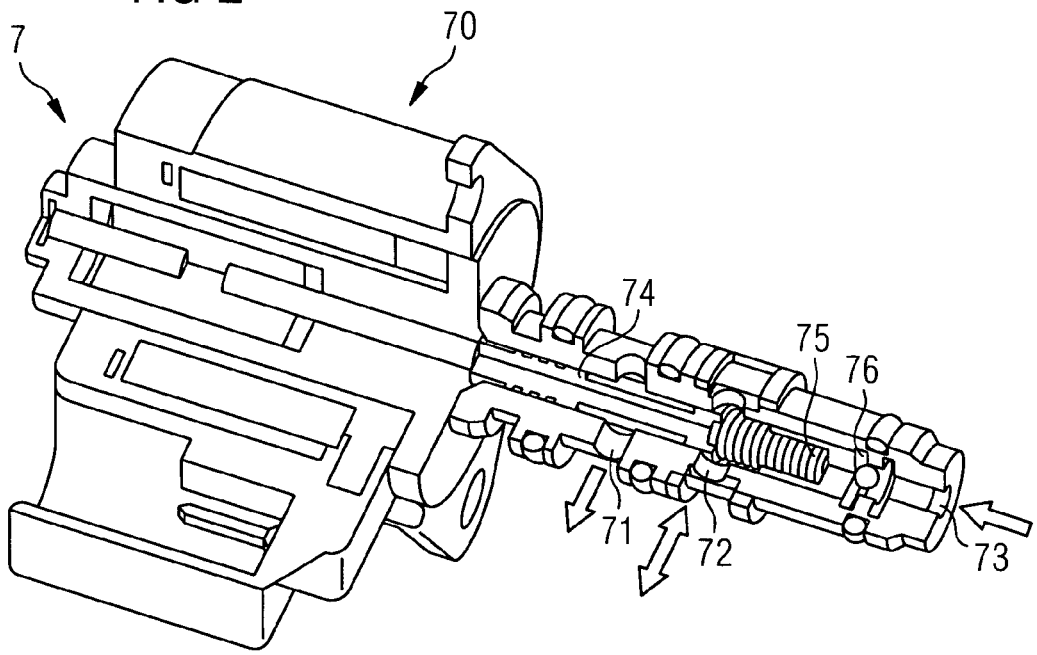
FIG. 2 shows a combination valve comprising a volume flow control valve and an electromechanical pressure regulator with a common actuator.

FIG. 2 shows a combination valve 7 comprising an actuator 70, the volume flow control valve 56 and the electromechanical pressure regulator 57. The combination valve 7 has an outlet 71 which is actively connected to the inlet of the high pressure pump 54, a connector 72 which is actively connected to the admission 53 and an inlet 73 which is actively connected to the fuel accumulator 55. The volume flow control valve 56 comprises the connector 72, the outlet 71, a valve positioner 74 and the actuator 70. The electromechanical pressure regulator 57 comprises the inlet 73, the connector 72, the valve positioner 74, a spring 75, a valve cap 76 and the actuator 70.

The actuator 70 moves the valve positioner 74 in the axial direction as a function of a regulating signal PWM. The spring 75 is arranged between the valve positioner 74 and the valve cap 76 and pre-stressed as a function of the axial position of the valve positioner 74. The valve positioner 74 is constructed in such a way that in the region of a first axial displacement of the valve positioner 74 in the direction of the spring 75, starting from its axial position in which it is pressed by the spring 75, without loading of the actuator 70 with the regulating signal PWM, the flow of fuel is substantially cut off. In this state only a leakage flow flows from the connector 72 to the outlet 71. In the region of a second axial displacement of the valve positioner 74 by corresponding loading of the actuator 70 with the regulating signal PWM the connector 72 is hydraulically coupled to the outlet 71. In the second region of the axial displacement of the valve positioner 74 a volume flow of a different magnitude can flow from the admission 53 into the connector 72 toward the outlet 71 and to the high pressure pump 54 as a function of the regulating signal PWM.

If the force caused by the fuel pressure in the fuel accumulator 55 is greater than the force caused by the pre-stressing of the spring and exerted on the valve cap 76, the inlet 73 is hydraulically coupled to the connector 72, so fuel can flow from the fuel accumulator 55 into the inlet 73 toward the outlet 72 into the admission 53.

The fuel pressure in the fuel accumulator 55, which is at least required to open the electromechanical pressure regulator, can be adjusted by increasing or reducing the regulating signal PWM. The actuator 70 increases or reduces the force accordingly which acts via the valve positioner 74 on the spring 75 and pre-stresses the spring 75. The force caused by pre stressing of the spring 75 closes the electromechanical pressure regulator if the force exerted on the valve cap 76 by the fuel pressure in the fuel accumulator 55 is smaller.

Figure 3:
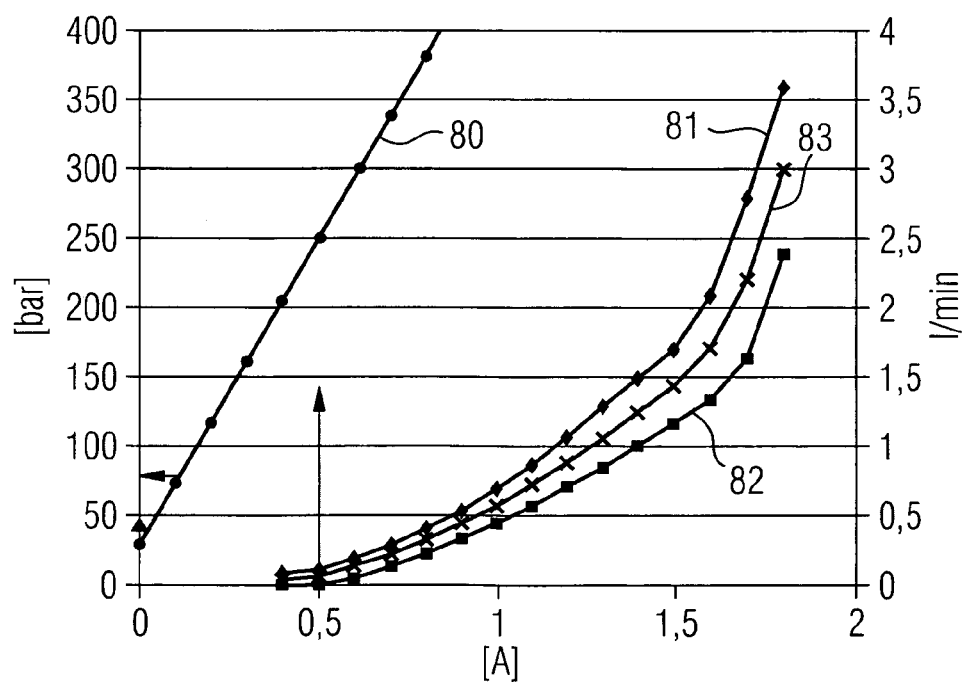
FIG. 3 shows the characteristic of the combination valve from FIG. 2.

FIG. 3 shows characteristics of the combination valve 7 illustrated in FIG. 2. A pressure curve 80 shows the connection between the regulating signal PWM in amps and the fuel pressure in the fuel accumulator 55 in bar. If with the given regulating signal PWM the fuel pressure in the fuel accumulator 55 is increased beyond the value specified by the pressure curve 80, the electromechanical pressure regulator 57 opens and reduces the fuel pressure in the fuel accumulator 55 by discharging fuel from the fuel accumulator 55 into the admission 53.

For values of the regulating signal PWM that are greater than a threshold value, which in this exemplary embodiment has a value of about 0.5 amp, the volume flow control valve 56 opens and allows a flow of fuel given in liters per minute. The graphs shows an upper flow curve 81 which represents an upper tolerance limit for the combination valve 7, a lower flow curve 82 which represents a lower tolerance limit for the combination valve 7, and a middle flow curve 83 which represents the average value between upper and lower flow curves. The flow curves 81, 82 and 83 show that in this exemplary embodiment the leakage flow may still flow below the threshold value, i.e. if the volume flow control valve 56 is substantially closed.

Figure 4:
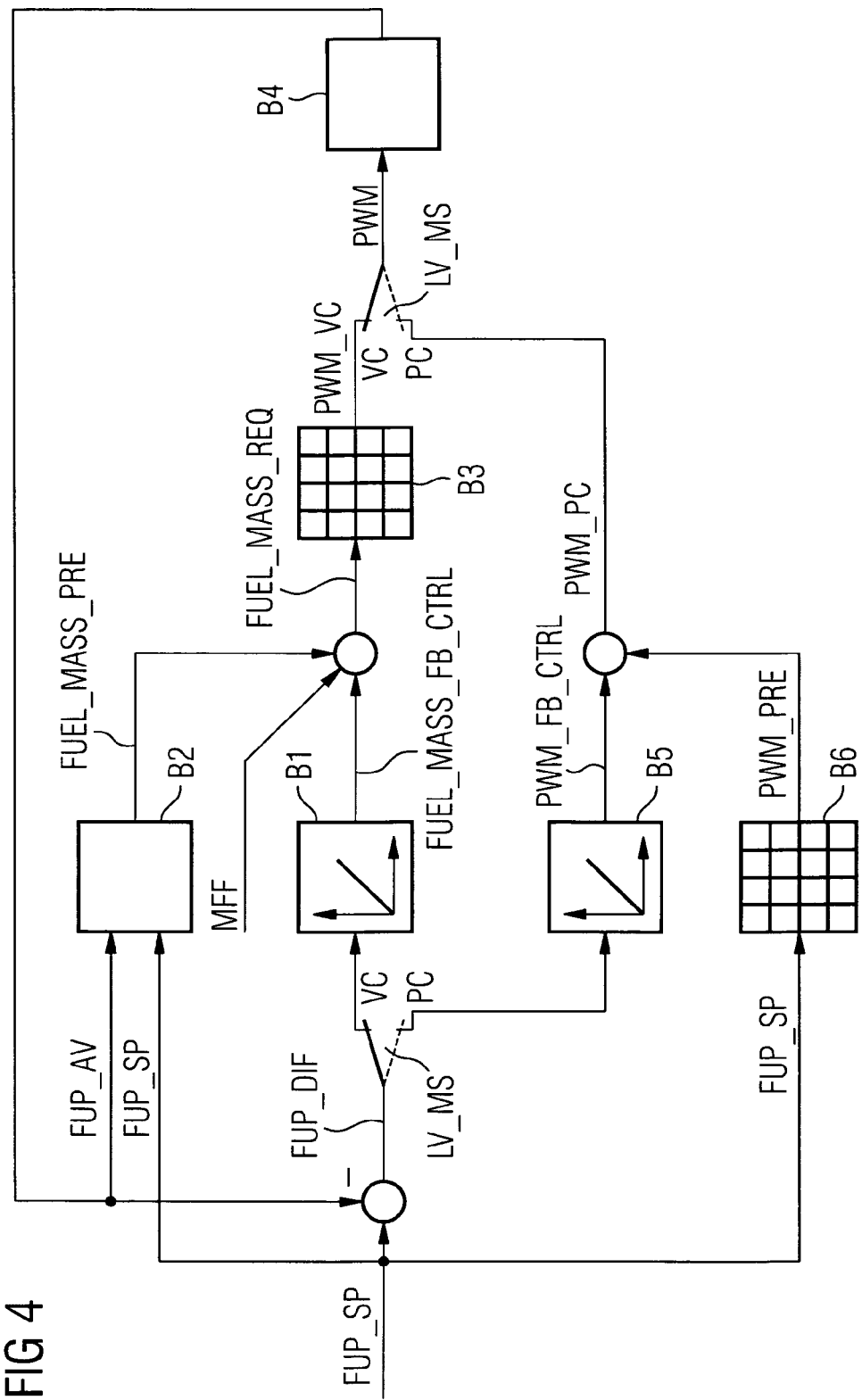
FIG. 4 shows the block diagram of a regulating device for regulating the fuel pressure in a fuel accumulator.

FIG. 4 shows a block diagram of a regulating device which may be used for regulating the fuel pressure in a fuel supply device 5 and comprises a combination valve 7, as is described by way of example in FIG. 2. The fuel pressure in the fuel accumulator 55 is regulated as a function of the current operating mode of the fuel supply device 5.

In a first operating mode the fuel pressure in the fuel accumulator 55 is adjusted as a function of the volume of fuel conveyed by the high pressure pump 54. The volume flow control valve 56 is open and the conveyed volume of fuel is dependent on the activation of the volume flow control valve 56. In this operating mode the electromechanical pressure regulator 57 is closed. If more fuel is conveyed into the fuel accumulator 55 than is appropriate the fuel pressure in the fuel accumulator 55 increases. If less fuel is conveyed into the fuel accumulator 55 than is appropriate the fuel pressure in the fuel accumulator 55 sinks accordingly. This first operating mode is called volume control VC.

In a second operating mode the volume flow control valve 56 is closed. Only the leakage flow flows through the volume flow control valve 56. If the electromechanical pressure regulator 57 is closed and less fuel than is appropriate is conveyed into the fuel accumulator 55 than via the leakage flow, the fuel pressure in the fuel accumulator 55 increases until the electromechanical pressure regulator 57 opens and the flow of fuel into the admission 53 is stopped. The fuel pressure in the fuel accumulator 55 is consequently limited to the fuel pressure specified by the electromechanical pressure regulator 57. This second operating mode is therefore called pressure control PC.

FIG. 4 shows two control circuits which can be switched between by means of a switch LV_MS as a function of the currently adjusted operating mode of the fuel supply device 5. If the currently adjusted operating mode is the first operating mode, i.e. volume control VC, the switch LV_MS is then in the position PS. If the currently adjusted operating mode is the second operating mode, i.e. pressure control PC, then the switch LV_MS is in the position PC.

A control deviation FUP_FID is determined from the difference between the specified fuel pressure FUP_SP and the detected fuel pressure FUP_AV. The control deviation FUP_FID is supplied to a regulator in block B1 in the case of volume control VC. This regulator comprises at least one integral part I_CTRL and is preferably constructed as PI regulator. A regulator value FUEL_MASS_FB_CTRL of the first regulator is determined in block B1. A pre-control value FUEL_MASS_PRE of the mass of fuel to be conveyed is determined in block B2 as a function of the specified fuel pressure FUP_SP and the detected fuel pressure FUP_AV. The pre-control value FUEL_MASS_PRE of the mass of fuel to be conveyed, the regulator value FUEL_MASS_FB_CTRL of the first regulator and the mass of fuel MFF to be injected are added up to give a mass of fuel to be conveyed FUEL_MASS_REQ. In the case of volume control VC a regulating signal PWM_VC is determined in a block B3 as a function of the mass of fuel to be conveyed FUEL_MASS_REQ. Block B3 preferably comprises performance data. A block B4 represents the fuel supply device 5 illustrated in FIG. 1 with the combination valve 7 shown in FIG. 2. The regulating signal PWM, which in the case of volume control VC is the same as the regulating signal PWM_VC, is the input variable of block B4. The output variable of block B4 is the detected fuel pressure FUP_AV which is detected for example by means of the fuel pressure sensor 58.

In the case of pressure control PC, the control deviation FUP_FID is supplied to a second regulator in a block B5. The regulator in block B5 preferably comprises a PI regulator. In a block B6 a pre-control value PWM_PRE for a regulating signal PWM_PC in the case of pressure control PC is determined as a function of the specified fuel pressure FUP_SP, to which is added a regulator value PWM_FB_CTRL of the second regulator determined in block B5. The total is the regulating signal PWM_PC in the case of pressure control PC. In the case of pressure control PC the regulating signal PWM is the same as the regulating signal PWM_PC in the case of pressure control PC. The block B6 preferably comprises performance data.

The performance data of blocks B3 and B6 are preferably determined in advance by way of experiments on an engine test stand, simulations or road trials. Alternatively functions based on physical models may also be used for example.

The block diagram shown in FIG. 4 is a preferred embodiment of a regulating device for a fuel supply device 5, comprising a combination valve 7 according to FIG. 2 and characteristics according to FIG. 3. If the volume flow control valve 56 and the electromechanical pressure regulator 57 each have their own actuator however, the regulating signal PWM_VC acts on the actuator of the volume flow control valve 56 in the case of volume control VC and the regulating signal PWM_PC acts on the actuator of the electromechanical pressure regulator 57 in the case of pressure control PC. Consequently both the regulating signal PWM_VC in the case of volume control VC and the regulating signal PWM_PC in the case of pressure control PC are supplied to block B4 instead of the common regulating signal PWM. The control circuits for the first and second operating modes preferably operate simultaneously in this case, so the switch LV_MS shown in FIG. 4 may be omitted. The control deviation FUP_FID is supplied to blocks B1 and B5. Simultaneously.

Figure 5:
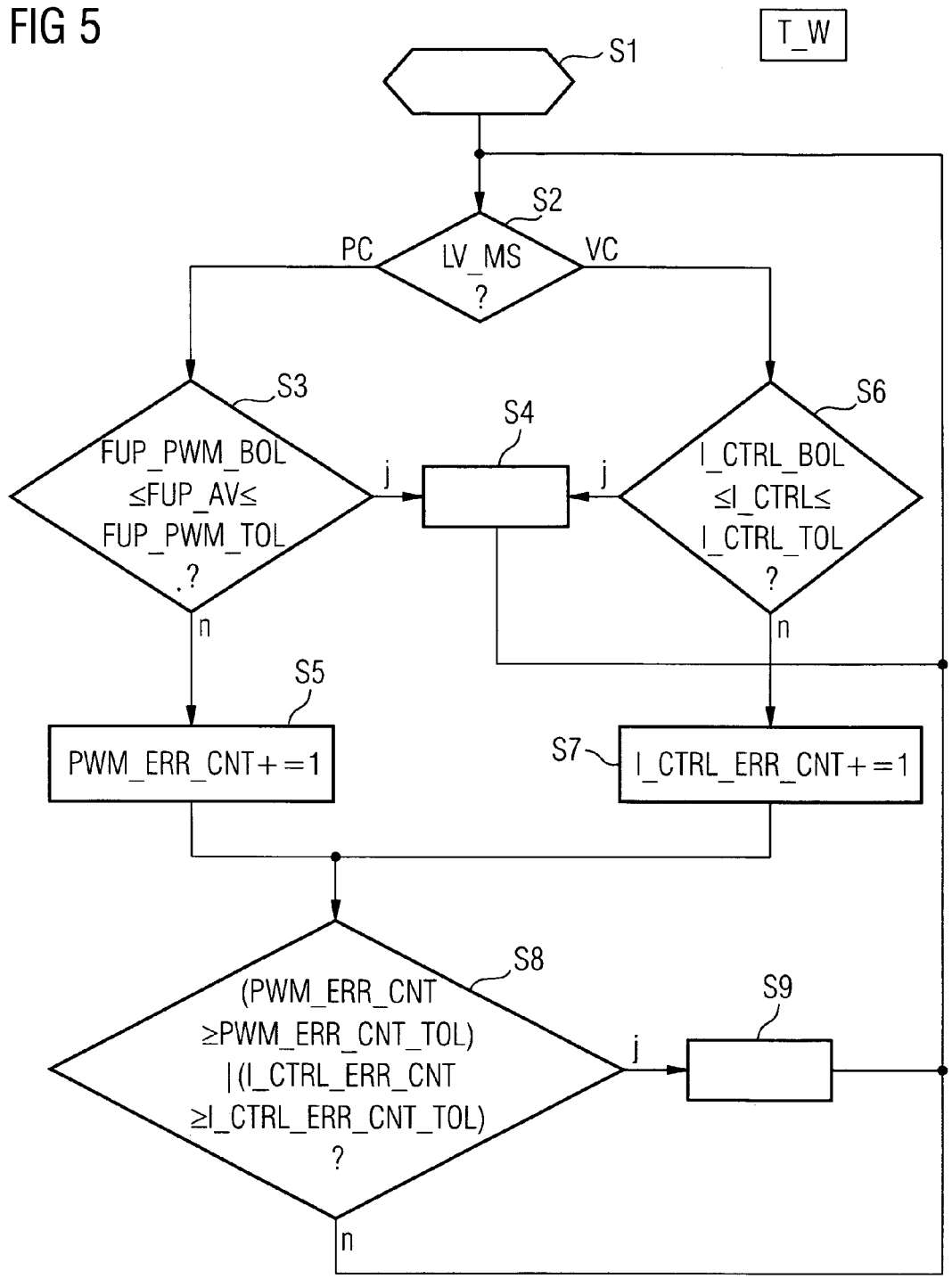
FIG. 5 shows a flow diagram for identifying errors in the fuel supply device.

FIG. 5 shows a flow diagram for identifying errors in a fuel supply device 5 of an internal combustion engine. The method is started in a step S1. Step S1 is preferably executed when the internal combustion engine starts. Step S1 preferably comprises further initialization steps, not shown here, such as resetting of counters.

The position of the switch LV_MS is checked in a step S2. If there is no switch LV_MS the current operating mode of the fuel supply device 5 is established in step S2.

If the current operating mode is the pressure control PC, the detected fuel pressure FUP_AV is checked in a step S3. If the detected fuel pressure FUP_AV is greater than or equal to a specified lower tolerance limit FUP_PWM_BOL for the fuel pressure FUP_AV and less than or equal to a specified upper tolerance limit FUP_PMW_TOL for the fuel pressure FUP_AV, no departure from the value range specified by the tolerance limits FUP_PWM_BOL and FUP_PWM_TOL is currently identified and processing is continued in a step S4. If in step S3 the detected fuel pressure FUP_AV is outside the value range specified by the tolerance limits FUP_PWM_BOL and FUP_PWM_TOL, there may be an error and processing is continued in a step S5. In a step S4 the error counters for example are checked and optionally provided with a new value. The error counters are reduced by a specified value for example. Following step S4 processing is continued again, after a waiting time T_W, in step S2. If the condition of step S3 is not satisfied, an error counter PWM_ERR_CNT of the regulating signal PWM is increased in step S5, by one for example.

If volume control VC is the current operating mode, following step S5 the integral part I_CTRL of the first regulator in block B1 is checked in step S6. If the integral part I_CTRL is greater than or equal to a specified lower tolerance limit I_CTRL_BOL of the integral part and less than or equal to a specified upper tolerance limit I_CTRL_TOL of the integral part, no departure from the value range specified by the tolerance limits I_CTRL_BOL and I_CTRL_TOL is currently identified and processing is continued in a step S4. Otherwise processing is continues in a step S7. Following step S4 processing is continued, after the waiting time T_W, in step S2. If the condition of step S6 is not satisfied, an error counter I_CTRL_ERR_CNT of the integral part I_CTRL is increased in step S7, by one for example.

A step S8 in which the values of the error counters are checked follows the increase in the error counter in step S5 or step S7. If the error counter PWM_ERR_CNT of the regulating signal PWM is greater than or equal to a specified upper error limit PWM_ERR_CNT_TOL of the error counter PWM_ERR_CNT of the regulating signal PWM or if the error counter I_CTRL_ERR_CNT of the integral part I_CTRL is greater than or equal to a specified upper error limit I_CTRL_ERR_CNT_TOL of the error counter I_CTRL_ERR_CNT of the integral part I_CTRL, an error is identified and measures are taken in a step S9 which, for example, register and store the exact location of the error and the circumstances of the error, ensure safe operation of the internal combustion engine and communicate the error to the driver of the motor vehicle. If exceeding of the error limits PWM_ERR_CNT_TOL and I_CTRL_ERR_CNT_TOL is not established in step S8, processing is continued, after the waiting time T_W, in a step S2.

In a further exemplary embodiment, not shown here, no error counters are provided. In this case an error is immediately identified if the conditions in step S3 or step S6 are not satisfied.

The invention claimed is:

1. A method for monitoring a fuel supply device of an internal combustion engine having a low pressure fuel circuit, comprising:
   connecting a high pressure pump having an input side to the low pressure fuel circuit;
   connecting a fuel volume flow control valve to the high pressure pump;
   receiving a pressurized fuel by a fuel accumulator from the high pressure pump;
   connecting an electromechanical pressure regulator to the fuel accumulator;
   detecting a pressure of the pressurized fuel;
   providing the detected fuel pressure to a first fuel pressure regulator as a control deviation;
   generating in a first operating mode a regulating signal for the fuel volume flow control valve by a first regulator wherein the first regulator comprises an integral part and a difference in a specified fuel pressure;
   determining in a first operating mode an error in the fuel supply device as a function of the integral part of the first regulator;
   generating in a second operating mode a regulating signal for the electromechanical pressure regulator by a second regulator wherein the difference in the specified fuel pressure and the detected fuel pressure is supplied to the second regulator as the control deviation; and
   determining in a second operating mode an error in the fuel supply device as a function of the detected fuel pressure and the regulating signal for the electromechanical pressure regulator.

2. The method according to claim 1, wherein in the first operating mode an error in the fuel supply device is determined if the integral part of the first regulator is:
   less than a specified lower tolerance limit of the integral part, or
   greater than a specified upper tolerance limit of the integral part.

3. The method according to claim 2, wherein in the second operating mode an error in the fuel supply device is determined if the detected fuel pressure is:
   less than a lower tolerance limit for the fuel pressure specified by the regulating signal for the electromechanical pressure regulator, or
   greater than an upper tolerance limit for the fuel pressure specified by the regulating signal for the electromechanical pressure regulator.

4. The method according to claim 3, wherein
   a combination valve is provided as the fuel volume flow control valve and the electromechanical pressure regulator, and the combination valve has a common actuator for the fuel volume flow control valve and the electromechanical pressure regulator, and
   the first operating mode is adjusted such that a present value of a common regulating signal is in a first value range of the common regulating signal, or the second operating mode is adjusted such that the present value of the common regulating signal is in a second value range of the common regulating signal.

5. A fuel supply device of an internal combustion engine, comprising:
   a low pressure fuel circuit that provides a fuel;
   a high pressure pump having an input side connected to the low pressure circuit side that pressurizes the fuel;
   a fuel accumulator that receives the pressurized fuel;
   a fuel volume flow control valve operatively connected to the high pressure pump; and
   an electromechanical pressure regulator actively connected to the fuel accumulator wherein the pressure regulator is capable of stopping the flow of fuel from the fuel accumulator into the low pressure circuit;
   a fuel pressure detector that detects the fuel pressure and generates fuel pressure signal;

a first fuel pressure regulator that receives the generated fuel pressure signal as a control deviation, wherein:

in a first operating mode a regulating signal for the fuel volume flow control valve is generated by a first regulator that comprises an integral part and a difference in a specified fuel pressure where an error in the fuel supply device is determined as a function of the integral part of the first regulator, and in a second operating mode a regulating signal for the electromechanical pressure regulator is generated by a second regulator where the difference in the specified fuel pressure and the detected fuel pressure is supplied to the second regulator as the control deviation and an error in the fuel supply device is determined as a function of the detected fuel pressure and the regulating signal for the electromechanical pressure regulator.

6. The fuel supply device as claimed in claim 5, wherein in the first operating mode an error in the fuel supply device is determined if the integral part of the first regulator is:

less than a specified lower tolerance limit of the integral part, or greater than a specified upper tolerance limit of the integral part.

7. The fuel supply device as claimed in claim 6, wherein in the second operating mode an error in the fuel supply device is determined if the detected fuel pressure is:

less than a lower tolerance limit for the fuel pressure specified by the regulating signal for the electromechanical pressure regulator, or greater than an upper tolerance limit for the fuel pressure specified by the regulating signal for the electromechanical pressure regulator.

8. The fuel supply device as claimed in claim 7, wherein a combination valve is provided as the fuel volume flow control valve and the electromechanical pressure regulator, and the combination valve has a common actuator for the fuel volume flow control valve and the electromechanical pressure regulator, and the first operating mode is adjusted such that a present value of a common regulating signal is in a first value range of the common regulating signal, or the second operating mode is adjusted such that the present value of the common regulating signal is in a second value range of the common regulating signal.

* * * * *